Figure 1A:
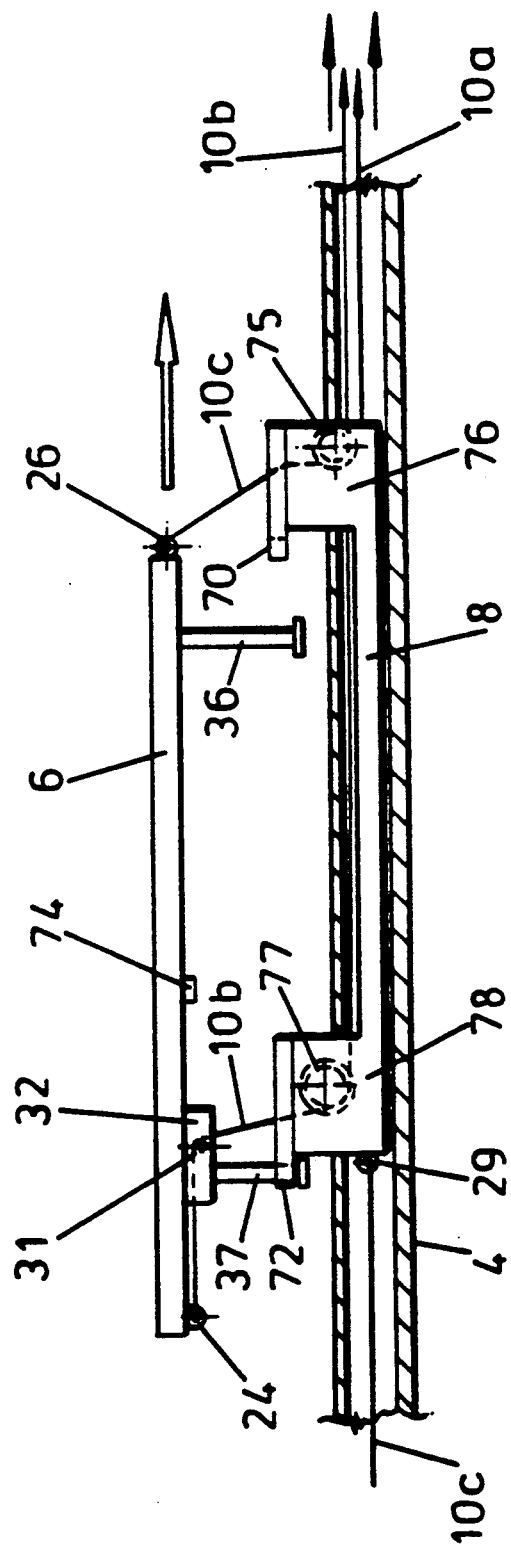

United States Patent [19]

Craig

[11] Patent Number: 5,102,091

[45] Date of Patent: Apr. 7, 1992

[54] AIRCRAFT TRAVERSING SYSTEM

[75] Inventor: Thomas M. Craig, Midlothian, United Kingdom

[73] Assignee: MacTaggart, Scott (Holdings) Ltd., Midlothian, United Kingdom

[21] Appl. No.: 688,021

[22] Filed: Apr. 19, 1991

[30] Foreign Application Priority Data

Apr. 21, 1990 [GB] United Kingdom ............... 9008969

[51] Int. Cl.⁵ .............................................. B64F 1/22
[52] U.S. Cl. ................................................ 244/116
[58] Field of Search .................. 244/110 E, 115, 116; 114/261, 230, 258, 262, 263; 104/173 R, 182; 212/77, 76, 215, 214, 205, 207

[56] References Cited

U.S. PATENT DOCUMENTS 4,319,722 3/1982 Pesando .............................. 244/116
4,786,014 11/1988 Pesando et al. ..................... 244/115

FOREIGN PATENT DOCUMENTS 598590 12/1925 France ................................. 244/116
2075931 11/1981 United Kingdom ................ 244/115

Primary Examiner—Galen Barefoot
Attorney, Agent, or Firm—Pennie & Edmonds

[57] ABSTRACT

A traversing system for handling aircraft, such as helicopters, on a ship comprises a rail (4) leading to the landing area; a shuttle (8) which moves along the rail and has forward and aft location slots (70,72) together with forward and aft guide pulleys (75,77) for respective handling wires; and a yoke (6), which is attached to the aircraft wheels (40), comprising a forward location pin (36) which can engage the shuttle forward location slot (70), an aft location pin (37) which can engage the shuttle aft location slot (72) and is mounted on a slidable block (32) which slides backwards and forwards on the yoke. The hauling wires (10c, 10b) pass through the guide pulleys on the shuttle and are attached to respective forward and aft positions (26,24) on the yoke, after the yoke has been attached to the aircraft wheels. The aft wire (10b) is then hauled by a winch to pull the yoke (and aircraft) until the aft pin (37) engages the aft slot (72). The slidable block (32) then slides along the yoke as continued hauling on the forward wire (10c) brings the forward pin (36) into engagement with the forward slot (70). The aircraft is then connected to the shuttle and may be hauled along the rail to a hangar area.

8 Claims, 4 Drawing Sheets

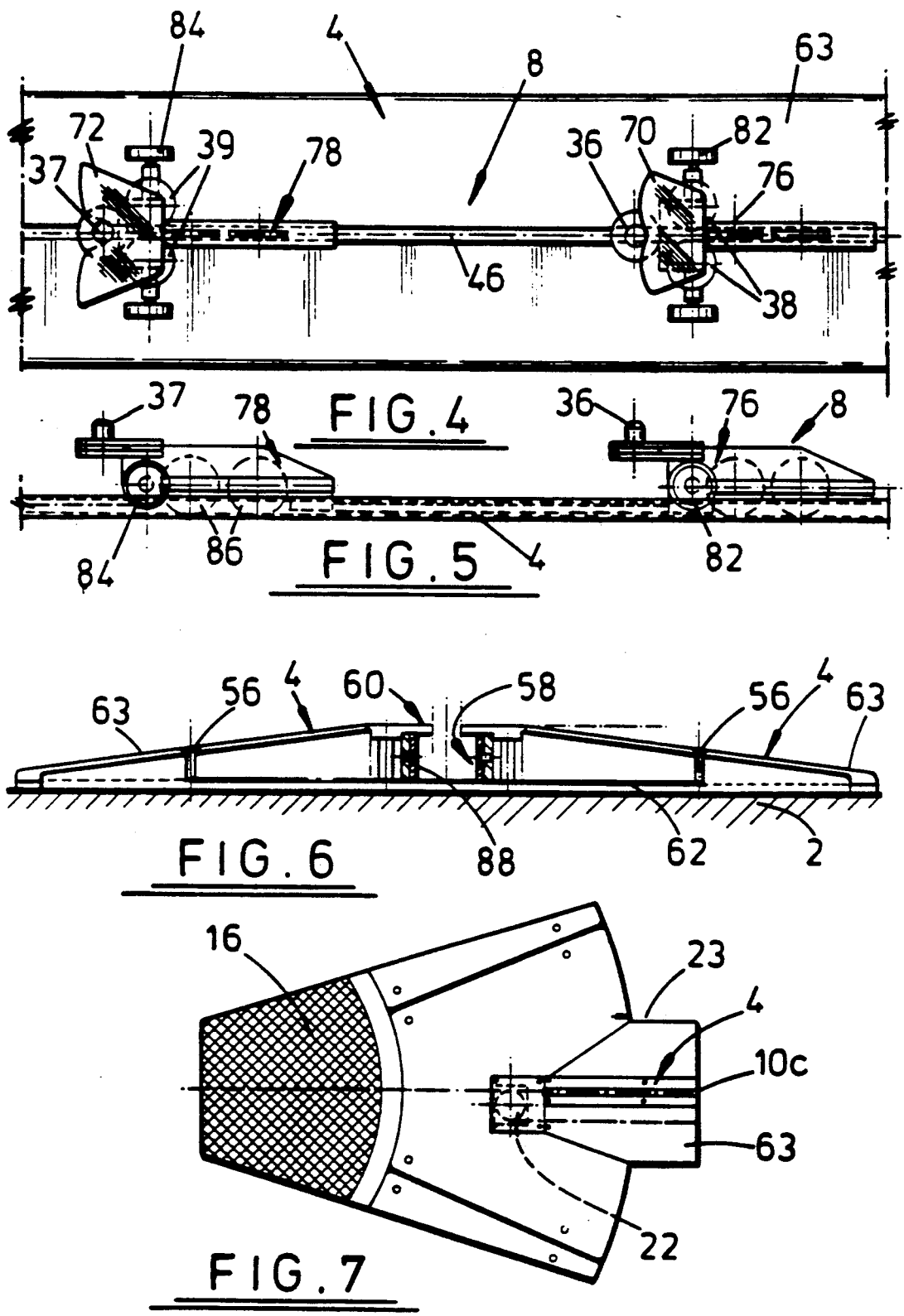

AIRCRAFT TRAVERSING SYSTEM

The present invention relates to a traversing system for handling aircraft, including helicopters and aeroplanes, on a ship.

Conventional naval vessels include a winch system for bringing an aircraft with controlled movement between the flight deck and hangar area. The system is particularly necessary for traversing aircraft between the flight deck and hangar in poor weather conditions when manual handling is not possible. Traditionally, a three winch system has been employed, which operates three wires attached to the aircraft. By adjusting the relative tensions in the wires, the aircraft may be traversed between the flight deck and the hangar. Such systems are capable of use in conditions up to Sea State 5. However, the system has its limitations and it would be desirable to provide a system capable of safe and reliable operation in even worse weather conditions, which are encountered for a substantial part of the winter time in the North Atlantic Ocean.

The present invention provides a traversing system for handling aircraft on a ship, which comprises;
  rail means for extending away from an aircraft landing area;
  a shuttle assembly engageable with the rail means and moveable therealong. comprising forward location means and aft location means, and forward and aft guide means adjacent the respective forward and aft location means for guiding forward and aft wires therethrough;
  a yoke assembly engageable with the aircraft and with the shuttle assembly, and comprising attachment means for attachment to the aircraft, a forward location element locatable in the forward shuttle location means, an aft location element locatable in the aft shuttle location means and mounted on a slidable block, the block being slidable rearwardly from a mid-position intermediate the length of the yoke assembly to a rearward position and having a guide element enabling the aft wire to pass through the slidable block, and a rearward attachment point for attaching the aft wire to a rearward end of the yoke assembly after having passed through the guide element, and a forward attachment point for attaching the forward wire to a forward end of the yoke assembly.

The rail means may be integrally installed in the ship's deck, or may be bolted onto the surface thereof. In the latter case, it is preferable to provide a ramped fairing along either side of the rail to blend the rail into the deck surface and avoid discontinuities. Preferably, a sheet of tough polymeric material is provided between the rail and the deck's surface to reduce strumming due to winch wires and to prevent damage to the deck or its paint treatment.

The rail means is generally in the form of a slot with re-entrant upper edges to retain bearings of the shuttle assembly. The inside of the rail section may be lined with wear resistant bearing material, such as phosphor bronze.

In addition to the forward wire and aft wire, there is preferably provided an out-haul wire connected to the rear end of the shuttle for moving the shuttle outwardly from the hangar area towards the landing area. The out-haul wire preferably extends around a pulley means provided at the landing area. Generally, the wires pass along the inside of the rail means, with the exception of the return run of the out-haul wire which usually passes beneath one of the fairings.

The shuttle assembly is usually engaged with the rail means by a slide bearing (for example a nylon bearing) or roller bearing, retained within the rail means by the re-entrant upper edges thereof. The forward and aft location means generally comprise slots into which the corresponding location elements on the yoke assembly are drawn as the yoke assembly is drawn into engagement with the shuttle assembly by tension on the forward and aft wires.

The forward and aft guide means on the shuttle generally comprise vertical and/or horizontal pulley means.

The yoke assembly is intended to engage the front wheels of the aircraft. Aircraft are conventionally provided with anchorage points on the undercarriage to which the rear of the yoke may be attached. The yoke is preferably triangular, with the apex at its leading end and having a bar extending from the apex rearwardly to the centre of the base along which the slidable block may move. A pair of castors may be provided on either lateral side of the yoke to assist manoeuvering of the yoke.

The forward and aft location elements are usually upstanding pins having an enlarged lower end.

The aft location element is mounted on a slidable block. The block is preferably lockable to the rest of the yoke assembly at the mid position so that in use the aft location element and location means become engaged before the forward location element and means. Engagement of the aft location element and means preferably causes the slidable block to become unlocked and free to move rearwardly of the yoke assembly. This arrangement improves the turning movement applied to the yoke when the yoke is being drawn onto the shuttle assembly. Other aspects of the invention include the construction of the yoke and the shuttle itself.

The system according to the present invention may be operated remotely using winches without the need for the presence of any personnel, once the yoke has been attached to the aircraft and the wires connected up. The rail guidance means provides positive handling of the aircraft thus allowing traversing even in poor weather conditions.

Figure 1B:
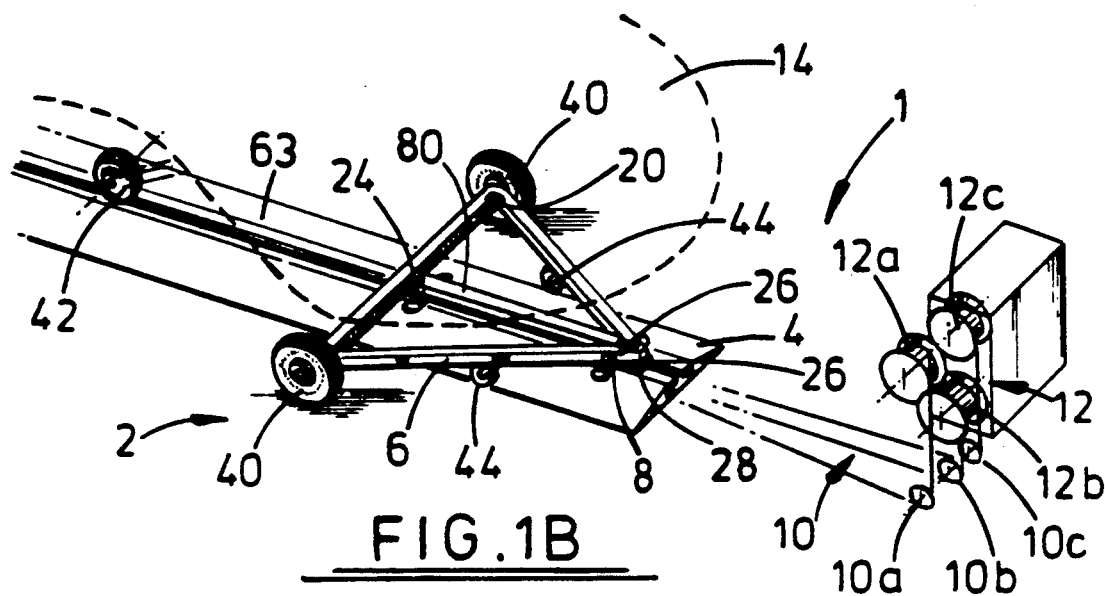
Figure 2:
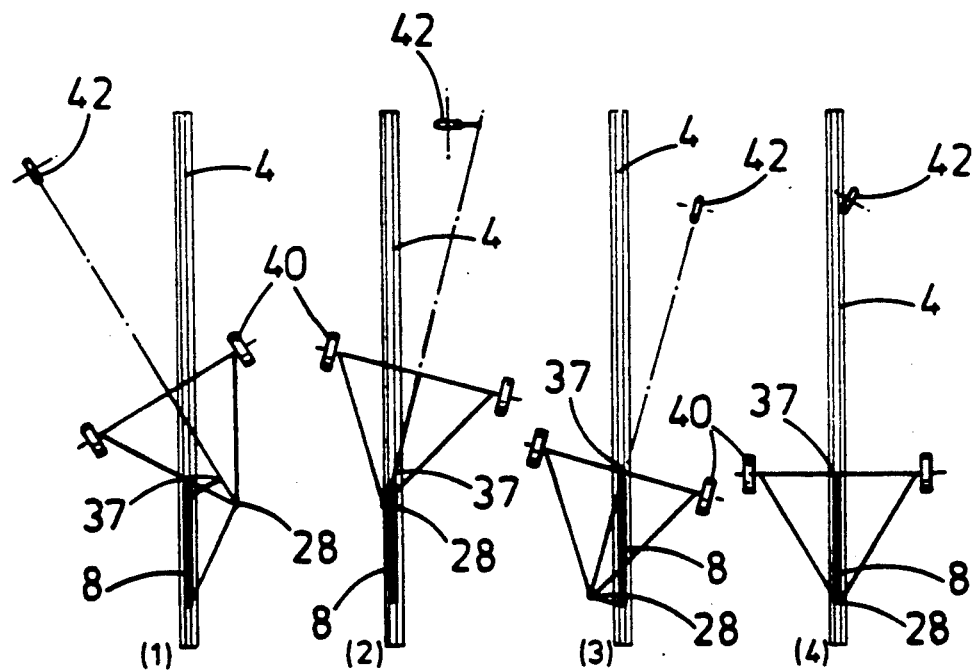
Figure 3A:
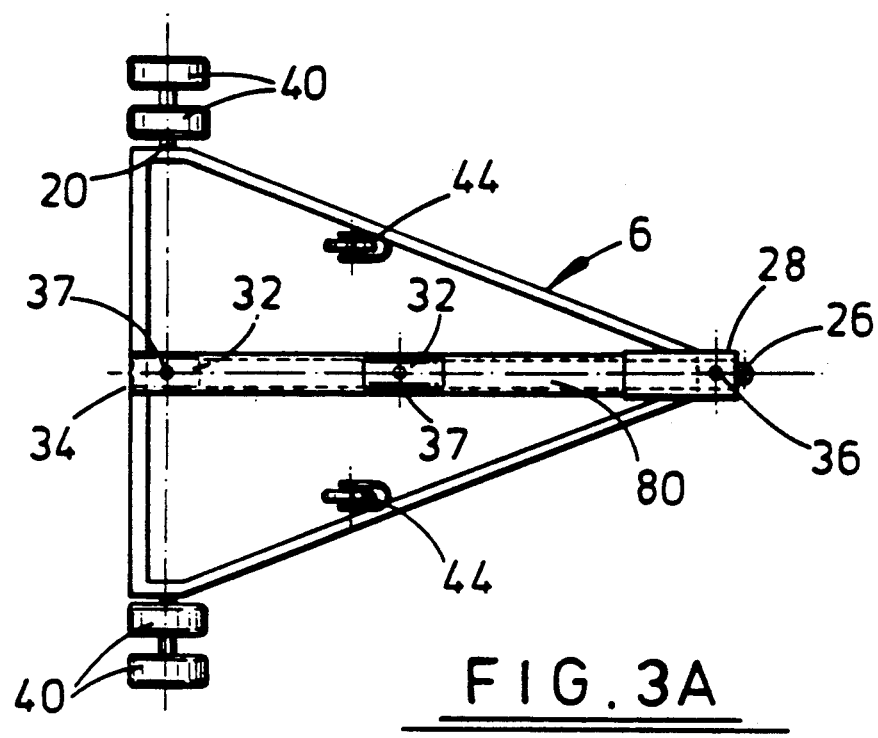
Figure 3B:
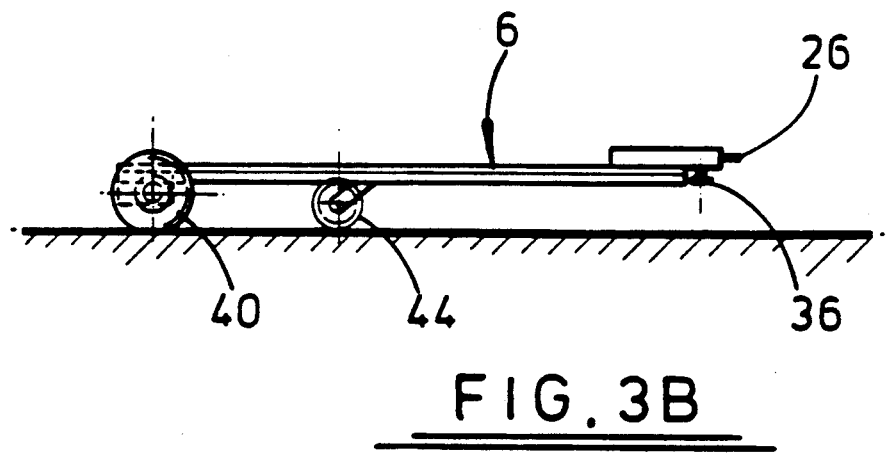

An embodiment of the present invention will now be described by way of example only with reference to the accompanying drawings wherein;
  FIG. 1A is a schematic drawing showing the principal parts;
  FIG. 1B is a perspective drawing of the traversing system attached to the wheels of an aircraft;
  FIG. 2 shows four stages (1 to 4) during the winching of the aircraft onto the traversing system;
  FIG. 3A is a plan view of the yoke assembly attached to the aircraft main wheels;
  FIG. 3B is a vertical elevation of the yoke assembly;
  FIG. 4 is a plan view of the shuttle assembly engaged in the rail;
  FIG. 5 is an elevation of the shuttle assembly;
  FIG. 6 is a cross section of the rail with bearings on either side; and
  FIG. 7 is a plan view of one end of the traversing system adjacent a deck landing grid.
  FIG. 1 is a purely schematic view of the principal parts of the traversing system for ease of understanding. For constructional details, reference should be made to the other drawings. FIG. 1 shows a traversing system comprising a rail 4 fixed to a deck 2 having slidably attached thereto a shuttle 8 having a forward location plate 70 and aft location plate 72 for engaging forward and aft vertical locating pins 36,37 respectively of yoke 6. Aft locating pin 37 is mounted on a slidable block 32, which in its forward position engages a lock 74 which becomes released when aft pin 37 engages aft location plate 72.

Forward wire 10a passes through forward shuttle 76 of the shuttle assembly around pulleys 75 and is attached to eye 26 at a forward end of the yoke. Wire 10b passes through pulleys 77 in the aft shuttle 78 of the shuttle assembly around a guide element 31 in slidable block 32 and is attached to eye 24 at the rear end of the yoke. Out-haul wire 10c is attached to eye 29 at a rearward end of the shuttle assembly for drawing the shuttle assembly out towards the landing area. FIG. 1B shows the rail 4 and yoke 6 in more detail. The yoke is attached by clips 20 to the main wheels 40 of a helicopter 14 shown in dotted lines (and having a trailing wheel 42). The yoke comprises a triangular frame having castors 44 attached to either side thereof, and a central member 80.

Winch assembly 12 comprises three grooved winch barrels 12a, 12b, 12c, each driven by a high torque hydraulic motor. Each motor has a multi disc spring applied brake and the motors operate respective wires 10a, 10b, 10c.

FIGS. 4 and 5 show the shuttle assembly 8 in more detail. It comprises a forward shuttle 76 rigidly linked by bar 46 to aft shuttle 78. Forward and aft location plates 70, 72 engage location pins 36, 37 of the yoke. Each shuttle comprises a pair of wheels 82, 84 which run on the upper surface 60 of the rail.

The forward shuttle 76 has a pair of horizontal pulleys 38 for handling forward wire 10c and a pair of vertical pulleys (not shown) for raising the in-haul wire from the cavity 58 in the rail. Similarly, aft shuttle 78 includes a pair of vertical pulleys 86 and horizontal pulleys 39 for handling aft wire 10b.

FIG. 5 shows rail 4 having inturned upper faces 60 defining a cavity 58. Phosphor bronze bearing strips 88 are provided along each internal wall for corporating with nylon slide bearings on the shuttle 8. The rail comprises two opposed sections each bolted separately to the deck of the ship with an intervening sheet of plastics material (Tufnol) in order to prevent the shuttle wires rubbing or strumming on the deck. Fairings 63 are screwed by means of screws 56 to the deck to provide the rail with a smooth contour.

FIG. 7 shows a deck lock grid 16 on which a helicopter equipped with a clamping system to engage into the deck lock may be landed. The rail 4 terminates adjacent the deck lock and a pulley 22 is provided for out-haul wire 10c which passes up the track 4 and back under the fairing 63.

The aircraft traversing system may be used to move a helicopter from the landing area to the hangar area as follows. The helicopter lands on deck lock 16 of the landing area and is automatically clamped thereto. The blades are then folded ready for moving the helicopter to the hangar area. Yoke 6 is wheeled out and clipped to attachment points 20 on the helicopter main wheels 40. Simultaneously, the out-haul winch 12c is operated to move the shuttle assembly 8 until it is almost parallel to the yoke, the two in-haul winches 12a, 12b providing light back-tension. When the aft shuttle 78 is approximately adjacent the apex of the yoke, the out-haul winch 12c is stopped and the brake is automatically applied. The operator selects "veer" on the aft in-haul winch 10b and a deck hand pulls the wire from the shuttle 78, leads it through the sliding block 32 and attaches it to the eye 24 at the rear of the yoke. The forward wire 10c is then drawn from the forward shuttle 76 and attached to eye 26 at the forward end of the yoke. The wires are lightly tensioned. The situation is shown in stage 1 of FIG. 2 which shows the helicopter in a skew position relative to the rail 4. There is now no requirement for personnel on deck for traversing of the aircraft.

The deck lock is now released, detaching the helicopter from the landing grid 16. The operator then selects "haul" on the aft wire 10b (with the forward wire 10a being lightly tensioned). This pulls on the sliding block 32 which is locked to lock 74 thus pulling round the front of the yoke until the aft locating pin 37 engages in location plate 72 in the aft shuttle, as shown in step 2 of FIG. 2. The sliding block 32 is then automatically released from lock 74. Continued tension on the aft wire 10b and on forward wire 10a causes the rear of the yoke to move forward over the slide 32 until forward locating pin 36 engages in forward location plate 70, thereby aligning the yoke with the shuttle and attaching it thereto due to the tension of the in-haul wires 10a, 10b. This is shown in steps 3 and 4 of FIG. 2.

As can be seen from FIG. 2, operation of the traversing system does not cause the helicopter tyres 40 to be scrubbed, one wheel being caused to rotate backwards and the other forwards during manoeuvering.

The operator now selects "in-haul" and the two in-haul winches 12a, 12b pull in the shuttle and yoke, drawing the helicopter from the landing area towards the hangar. The out-haul winch 12c provides back tension to prevent the aircraft running away. When the aircraft is in the hangar the operator disengages the winches when all the brakes are automatically applied. The aircraft can now be lashed down. There is no need to remove the yoke from the aircraft.

The aircraft may be returned from the hangar to the landing/take off area by a reversal of this procedure.

I claim:

1. A traversing system for handling aircraft on a ship, which comprises;
   rail means for extending away from an aircraft landing area;
   a shuttle assembly engageable with the rail means and moveable therealong, comprising forward location means and aft location means, and forward and aft guide means adjacent the respective forward and aft location means for guiding forward and aft wires therethrough;
   a yoke assembly engageable with the aircraft and with the shuttle assembly, and comprising attachment means for attachment to the aircraft, a forward location element locatable in the forward shuttle location means, an aft location element locatable in the aft shuttle location means and mounted on a slidable block, the block being slidable rearwardly from a mid-position intermediate the length of the yoke assembly to a rearward position and having a guide element enabling the aft wire to pass through the slidable block, and a rearward attachment point for attaching the aft wire to a rearward end of the yoke assembly after having passed through the guide element, and a forward attachment point for attaching the forward wire to a forward end of the yoke assembly.

2. A system according to claim 1 which further comprises a ramped fairing along either side of the rail means.

3. A system according to claim 1 wherein the rail means is in the form of a slot having a re-entrant upper edges, the shuttle assembly being provided with bearings which locate in the slot and are retained by the re-entrant upper edges.

4. A system according to claim 1 which further comprises out-haul attachment means at a rearward end of the shuttle assembly for attaching an out-haul wire thereto.

5. A system according to claim 1 which further comprises lock means to lock the slidable block to the yoke when the slidable block is at said mid-position of the yoke.

6. A system according to claim 5 wherein the lock means is provided with unlocking means which unlocks the slide block from the mid-position once the aft location element and aft location means have become engaged.

7. A system according to claim 1 which further comprises castors mounted on the yoke assembly to facilitate manoevouring thereof.

8. A system according to claim 1 which comprises said aft wire and said forward wire, and further comprises winch means connected thereto.

* * * * *